UNITED STATES PATENT OFFICE.

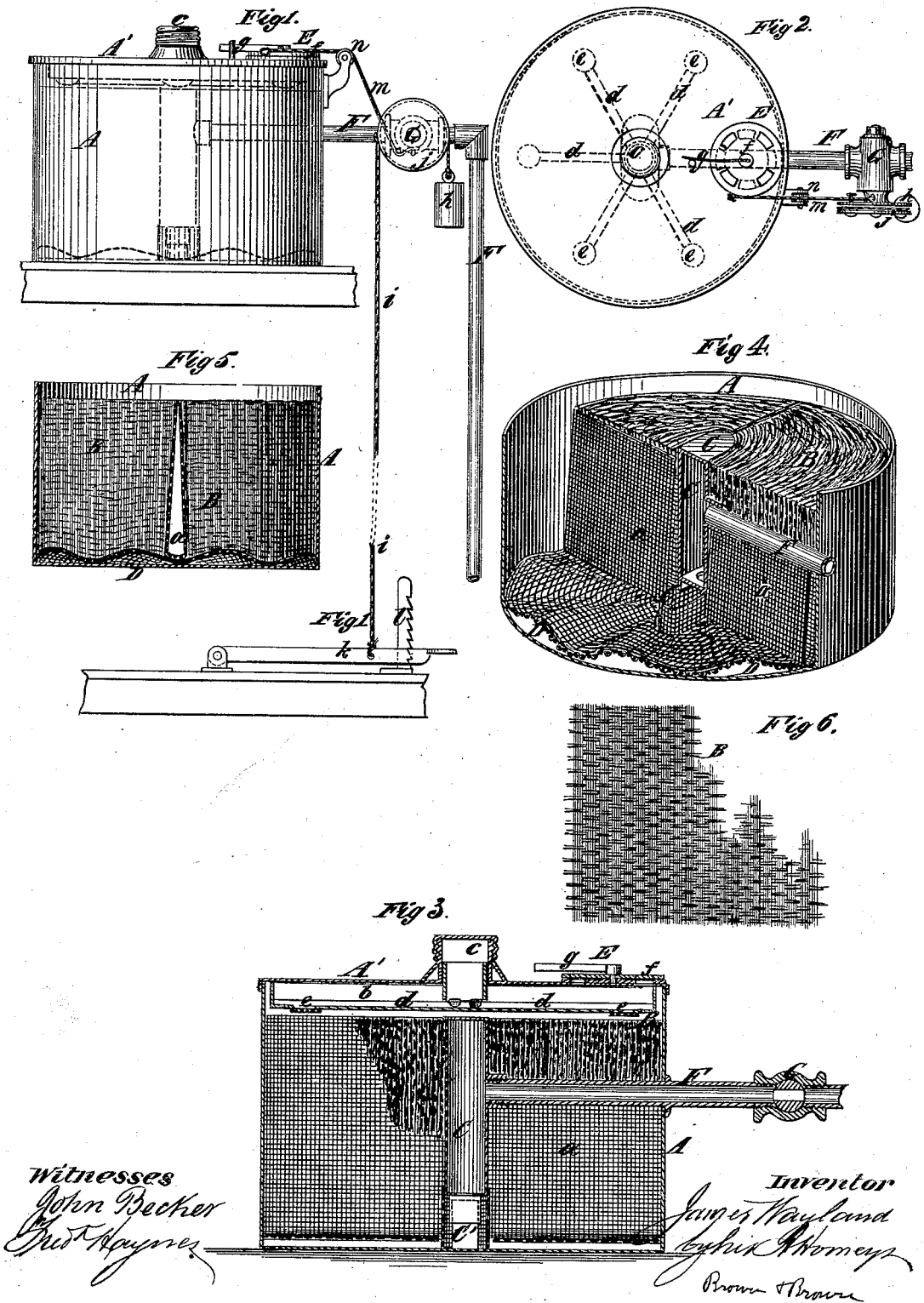

JAMES WAYLAND, OF NEWARK, ASSIGNOR TO EDWARD P. BRAY, OF ELIZABETH, N. J., ALBION L. MELLEN, OF BOSTON, MASS., AND DAVID CURRIER, OF NEW YORK, N. Y., ONE-FOURTH TO EACH.

IMPROVEMENT IN CARBURETERS.

Specification forming part of Letters Patent No. 221,948, dated November 25, 1879; application filed March 15, 1879.

*To all whom it may concern:*

Be it known that I, JAMES WAYLAND, of Newark, in the county of Essex and State of New Jersey, have invented certain new and useful Improvements in Carbureters, of which the following is a specification.

The object of my invention is to produce a carbureter in which the distribution of air and the carbureting-liquid through the absorbent material may be readily effected, and in which the danger of fire and explosion is greatly diminished.

To this end the invention consists in a carbureter comprising a centrally-arranged gas collector or reservoir; an absorbent consisting of successive upright layers of woven or reticulated fibrous material, arranged in sections, pads, or segments around said gas collector or reservoir; perforated or reticulated material inserted between said sections, pads, or segments, and forming upwardly-tapering chambers; and a corrugated plate formed of perforated or reticulated material placed below the absorbent and resting upon the bottom of the carbureter, so that the absorbent material may at intervals dip into any liquid which may collect at the bottom of the carbureter.

It also consists in the combination, with a carbureter, of a valve, whereby the admission of air thereto, and a cock or valve, whereby the outflow of gas therefrom, are regulated, the two being so connected as to be simultaneously opened, and each having applied to it a spring or equivalent device for automatically and independently closing it.

It also consists in a novel distributer for air and carbureting-liquid entering the carbureter, and in details of construction hereinafter described.

In the accompanying drawings, Figure 1 represents a side elevation of a carbureter embodying my improvements. Fig. 2 represents a plan view thereof. Fig. 3 represents a vertical section thereof. Fig. 4 represents a perspective view thereof, partly in section, certain parts being removed, the better to illustrate my invention. Fig. 5 represents a vertical section of a portion of the apparatus; and Fig. 6 represents a detail view, showing the character of the material used as an absorbent for the carbureting-liquid.

Similar letters of reference designate corresponding parts in all the figures.

A designates the case of the apparatus, and B the material used as an absorbent of the carbureting-liquid. The case is here represented as of circular form and as provided with a gas collector or reservoir, C, arranged at or near the center of the absorbent material, the lower portion, C', of which is formed of perforated or reticulated material. Although the case may be square, the circular form is very desirable, as it permits the gas to readily reach the gas-reservoir from all directions; and as the gas collector or reservoir is arranged at or near the center of the absorbent material, there is no danger of the carbureting-liquid spilling when the case is tilted, as there would be if the gas-reservoir were arranged upon one side of the case.

The absorbent material B is, preferably, composed of woven or reticulated material—such, for instance, as burlap or other loosely-woven substance, arranged in successive layers or folds. This form of absorbent is very desirable, as the ends of the fibers from which it is woven take up liquid and transmit it by capillary attraction.

In order to present as great a surface as possible for the absorption of the liquid, and to provide for the free circulation of air, I may divide the absorbent into sections, pads, or segments, as here represented, and also form the case A with a plate or false bottom, D, of perforated or reticulated material. (Clearly represented in Figs. 4 and 5.) This plate is, prefably, corrugated, so that at intervals the absorbent may extend to the bottom of the case, in order to take up any liquid which may collect there.

I have shown the sections, pads, or segments of absorbent material separated by means of pieces of perforated or reticulated material, *a*, bent, as represented clearly in Fig. 5, so as to form upwardly-tapering chambers, in which the mixing of vapors of the carbureting-liquid and air is completed. I make these chambers downwardly-tapering, so that air entering the case may not pass directly into them, but can only enter them after having passed through the absorbent material.

A' designates the cover of the carbureter. It is provided with an internal chamber, b, into which the carbureting-liquid may be poured through the filling-mouth c after removing the screw-top.

The chamber b is represented as provided with a number of channels or passages, d, radiating from its center, as represented in dotted outline in Fig. 2.

Each channel or passage terminates in a discharge-opening, e, represented in Figs. 2 and 3 as provided with a screen or sieve for precluding the entrance of dirt. This arrangement of passages and openings distributes the liquid over the absorbent material arranged within the case.

To provide for the entrance of air I furnish the cover A' with an air register or valve, E, opening into the chamber b, from which air passes into the case of the apparatus through the openings e, by which it is properly distributed. This air-register is represented as formed of a series of holes in the cover A' and a plate, f, also furnished with a series of holes. This plate is pivoted to the cover A', so that it may be turned or oscillated in order to open or close the holes, and is provided with a spring, g, or other equivalent device—such, for instance, as a weight—by which it is made to shut off the supply of air when not otherwise actuated.

When the carbureter is intended to be placed in the upper part of a building to be lighted, the service-pipe F, which communicates with the central gas-reservoir, C, forms a siphon, by which the carbureted air is drawn from the carbureter and supplied to the burners throughout the building. This service-pipe is provided with a cock or valve, G, for regulating the outflow of gas from the carbureter, and I may attach to said cock or valve a weight, h, by which it is kept closed unless otherwise actuated. In lieu of the weight h a spring or equivalent device may be employed. I prefer, also, to connect the cock or valve G and the air-register E, so that the opening of the cock or valve opens, in a corresponding degree, the air-register, and so that upon the cock or valve being closed the register is released and closed by the action of the spring g. The means here shown for accomplishing this purpose consists of a cord, m, passing over a pulley, n, and connecting the cock or valve and the air-register.

When the carbureter is to be placed in the upper part of a building, I may provide the cock or valve G with a cord, i, passing over a pulley, j, upon the stem of the cock or valve and descending to one of the lower floors of the building. The cord may be connected to a lever, k, as represented in Fig. 1, which may be actuated to open the cock or valve G.

I have shown the lever k adapted to be made to engage with a ratchet-bar, l, by which it is held in different positions. Upon the lever being released from the bar l the cock or valve is closed by the action of the weight h.

When it is desired to charge the apparatus with liquid, it may be disconnected from the service-pipe F and removed from the building for the purpose of filling it. During its removal the cock or valve G is closed by the action of the weight h, and the air-register E is closed by the spring g, thus preventing gas from escaping.

The absorbent material having been saturated with as much liquid as it will hold in suspension, the carbureter is connected to its service-pipe, and the cock or valve G and the air-register E opened by forcing down the lever k. The air, entering the case A through the register E and openings e, is caused to pass downward through the absorbent material by the action of the siphon formed by the service-pipe. The air then passes into the chambers formed between the sections, pads, or segments of absorbent material, and the mixing of the vapors and air is completed, forming gas. The gas so formed may then pass into the gas collector or reservoir C through the perforated or reticulated portion C', and thence into the service-pipe F.

By my invention I provide an apparatus in which the air may be expeditiously and thoroughly carbureted, and which may be used without danger, as the admission of air and the outflow of gas are simultaneously and correspondingly regulated, and are both automatically stopped when the carbureter is disconnected from the service-pipe.

I am aware that carbureters have been constructed having a centrally-arranged gas collector or reservoir, an absorbent composed of fibrous material arranged about said gas-collector, and a corrugated bottom plate.

I am also aware that carbureters have been constructed having an air-inlet valve and a gas-outlet valve, both provided with means for closing them automatically. These I do not claim as my invention; but

What I claim as my invention, and desire to secure by Letters Patent, is—

1. In a carbureter, the combination of a centrally-arranged gas collector or reservoir, C, an absorbent consisting of successive upright layers of woven or reticulated fibrous material, arranged in sections, pads, or segments B around said gas collector or reservoir, perforated or reticulated material a inserted between said sections, pads, or segments, and forming upwardly-tapering chambers radiating from the gas collector or reservoir, and a corrugated plate, D, formed of perforated or reticulated material placed below the absorbent material and resting on the bottom of the carbureter, substantially as and for the purpose specified.

2. The combination, with a carbureter, of a register or valve, E, whereby the admission of air is regulated, and a cock or valve, G, whereby the outflow of gas is regulated, the two being connected together so as to be opened simultaneously, a spring, $g$, or equivalent device, applied to said register or valve E, and a weight, $h$, or equivalent device, applied to said cock or valve G, whereby they may both be automatically closed, substantially as specified.

3. The combination, with a carbureter, of a cover, A', provided with an internal chamber, $b$, a filling-mouth, $c$, and an opening for the admission of air, both communicating with said chamber $b$, the bottom plate of which is provided with a series of channels or passages, $d$, radiating from the center thereof, and each terminating in a discharge-opening, $e$, substantially as and for the purpose specified.

4. The combination of the case A, cover A', absorbent material B, central gas collector or reservoir, C, corrugated plate or false bottom D, air register or valve E, service-pipe F, and cock or valve G, arranged and operating substantially as specified.

JAMES WAYLAND.

Witnesses:
T. J. KEANE,
FRED. HAYNES.